United States Patent
Park et al.

(10) Patent No.: US 12,480,595 B2
(45) Date of Patent: Nov. 25, 2025

(54) ANTI FREEZE VALVE APPARATUS AND SEMICONDUCTOR PROCESSING DEVICE INCLUDING THE SAME AND MANUFACTURING METHOD THEREOF

(71) Applicant: SEMES CO., LTD., Chungcheongnam-do (KR)

(72) Inventors: Jin Se Park, Chungcheongnam-do (KR); Ki Bong Kim, Gyeonggi-do (KR); Myung Seok Cha, Seoul (KR)

(73) Assignee: SEMES CO., LTD., Chungcheongnam-do (KR)

( * ) Notice: Subject to any disclaimer, the term of this patent is extended or adjusted under 35 U.S.C. 154(b) by 388 days.

(21) Appl. No.: 17/973,495

(22) Filed: Oct. 25, 2022

(65) Prior Publication Data

US 2023/0136985 A1    May 4, 2023

(30) Foreign Application Priority Data

Nov. 4, 2021    (KR) .......................... 10-2021-0150676

(51) Int. Cl.
*F16K 31/122*        (2006.01)
(52) U.S. Cl.
CPC ................................ *F16K 31/1221* (2013.01)
(58) Field of Classification Search
CPC .. F16K 31/1221; F16K 31/1226; F16K 35/00; F16K 27/02; F16K 17/04; F16L 59/029; F16L 59/021; F16L 59/02; F16L 59/161; F16L 59/168; F16L 59/141; F16L 59/16; H01L 21/67017; F17C 13/001; F17C 13/02

USPC .......................... 251/63.6, 366, 368; 137/375
See application file for complete search history.

(56) References Cited

U.S. PATENT DOCUMENTS

| | | | | |
|---|---|---|---|---|
| 6,374,851 | B1* | 4/2002 | Coventry | F17C 1/12 137/592 |
| 6,488,258 | B1* | 12/2002 | Dantlgraber | F15B 13/01 251/63.6 |
| 6,708,502 | B1* | 3/2004 | Aceves | F17C 3/08 220/560.08 |
| 7,854,236 | B2* | 12/2010 | Jibb | F16L 59/065 285/47 |
| 8,511,335 | B2* | 8/2013 | Murphy | F16L 59/161 137/294 |

(Continued)

FOREIGN PATENT DOCUMENTS

| | | |
|---|---|---|
| CN | 105102133 | 11/2015 |
| JP | 2016-089889 | 5/2016 |

(Continued)

OTHER PUBLICATIONS

Office Action dated Jul. 19, 2023 for Korean Patent Application No. 10-2021-0150676 and its English translation from Global Dossier.

(Continued)

*Primary Examiner* — Daphne M Barry
(74) *Attorney, Agent, or Firm* — WOMBLE BOND DICKINSON (US) LLP

(57) ABSTRACT

The present disclosure provides a valve apparatus that prevents defects in the valve apparatus and prevents damage to the heat insulating material due to a cryogenic liquid fluid, and a semiconductor processing device including the same and a manufacturing method thereof.

7 Claims, 3 Drawing Sheets

(56) References Cited

U.S. PATENT DOCUMENTS

| | | | |
|---|---|---|---|
| 8,684,036 B1 | 4/2014 | Satoda | |
| 8,991,636 B2* | 3/2015 | Verhulst | F17C 13/001 220/23.89 |
| 9,803,768 B2* | 10/2017 | Satoda | F16K 27/029 |
| 10,549,740 B2 | 2/2020 | Schnittger et al. | |
| 2015/0014570 A1* | 1/2015 | Sarda | F16L 59/16 251/366 |

FOREIGN PATENT DOCUMENTS

| | | |
|---|---|---|
| JP | 2019-501056 | 1/2019 |
| KR | 10-1029356 | 4/2011 |
| KR | 10-2015-0122805 | 11/2015 |
| KR | 10-2156572 | 9/2020 |

OTHER PUBLICATIONS

Office Action (1st) dated May 24, 2025 for Chinese Patent Application No. 202211360562.8 and its English translation from Global Dossier.

\* cited by examiner

ANTI FREEZE VALVE APPARATUS AND SEMICONDUCTOR PROCESSING DEVICE INCLUDING THE SAME AND MANUFACTURING METHOD THEREOF

CROSS-REFERENCE TO RELATED APPLICATION

This application claims priority from Korean Patent Application No. 10-2021-0150676 filed on Nov. 4, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an anti-freeze valve apparatus and a semiconductor processing device including the same and a manufacturing method thereof.

2. Description of the Related Art

A valve apparatus installed in a supercritical liquefier may control the flow rate of the cryogenic liquid fluid. When the liquid fluid controlled by the valve apparatus falls below zero, moisture in the atmosphere surrounding the valve apparatus may freeze, which may lead to defects in the valve apparatus. In addition, when the valve apparatus introduces or discharges air, a heat insulating material surrounding the valve apparatus may be damaged due to air pressure.

Therefore, when the liquid fluid controlled by the valve apparatus falls below zero, there is a need to prevent defects in the valve apparatus and damage to the heat insulating material surrounding the valve apparatus.

SUMMARY

Aspects of the present disclosure provide a valve apparatus that prevents defects in the valve apparatus due to a cryogenic liquid fluid and damage to a heat insulating material.

Aspects of the present disclosure also provide a semiconductor processing device including a valve apparatus that prevents defects in the valve apparatus due to a cryogenic liquid fluid and damage to a heat insulating material.

Aspects of the present disclosure also provide a method for manufacturing a semiconductor processing device including a valve apparatus that prevents defects in the valve apparatus due to a cryogenic liquid fluid and damage to a heat insulating material.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

Technical Solution

According to an aspect of the present disclosure, there is provided a semiconductor processing device comprising a supercritical liquefier and a valve apparatus installed in a lower part of the supercritical liquefier, wherein the valve apparatus comprises: an adjusting member; a spring configured to contract or relax through the adjusting member; a safety valve body configured to contract or relax with the spring; a valve piston pressurized by a movement of the safety valve body; a piston ring configured to surround the valve piston; a valve housing configured to surround the adjusting member, the spring, the safety valve body, the valve piston, and the piston ring; an airtight member configured to form a sealed space that blocks the penetration of external substances by surrounding the valve housing; and a heat insulating material configured to surround the airtight member.

In some embodiments, the airtight member of the semiconductor processing device is made up of resin.

In some embodiments, the airtight member of the semiconductor processing device is made up of plastic.

In some embodiments, the heat insulating material of the semiconductor processing device is made up of Styrofoam.

In some embodiments, the semiconductor processing device further a first gas supplier configured to supply gas and a second gas supplier configured to receive the gas, and the gas is controlled by the valve apparatus.

In some embodiments, according to the semiconductor processing device, the heat insulating material surrounds the first gas supplier and the second gas supplier.

According to another aspect of the present disclosure, there is provided a valve apparatus, comprising: an adjusting member; a spring configured to contract or relax through the adjusting member; a safety valve body configured to contract or relax with the spring; a valve piston pressurized by a movement of the safety valve body; a piston ring configured to surround the valve piston; a valve housing configured to surround the adjusting member, the spring, the safety valve body, the valve piston, and the piston ring; an airtight member configured to form a sealed space that blocks the penetration of external materials by surrounding the valve housing, and a heat insulating material configured to surround the airtight member.

In some embodiments, the airtight member of the valve apparatus is made up of resin.

In some embodiments, the airtight member of the valve apparatus is made up of plastic.

In some embodiments, the heat insulating material of the valve apparatus is made up of Styrofoam.

According to another aspect of the present disclosure, there is provided a method for manufacturing a semiconductor processing device, the method comprising: mounting an adjusting member, a spring configured to contract or relax through the adjusting member, a safety valve body configured to contract or relax with the spring, a valve piston f by a movement of the safety valve body, a piston ring configured to surround the valve piston, a valve housing configured to surround the adjusting member, the spring, the safety valve body, the valve piston, and the piston ring, and an airtight member configured to form a sealed space that blocks the penetration of external materials by surrounding the valve housing; forming a valve apparatus by packing a heat insulating material surrounding the airtight member; and installing the valve apparatus in a lower part of a supercritical liquefier.

In some embodiments, according to the method for manufacturing a semiconductor processing device, the airtight member is made up of resin.

In some embodiments, according to the method for manufacturing a semiconductor processing device, the airtight member is made up of plastic.

In some embodiments, according to the method for manufacturing a semiconductor processing device, the heat insulating material is made up of Styrofoam.

In some embodiments, the method for manufacturing a semiconductor processing device further comprise installing a first gas supplier configured to control gas to be supplied through the valve apparatus and supply the gas, and a second gas supplier configured to receive the gas.

In some embodiments, according to the method for manufacturing a semiconductor processing device, the heat insulating material surrounds the first gas supplier and the second gas supplier.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
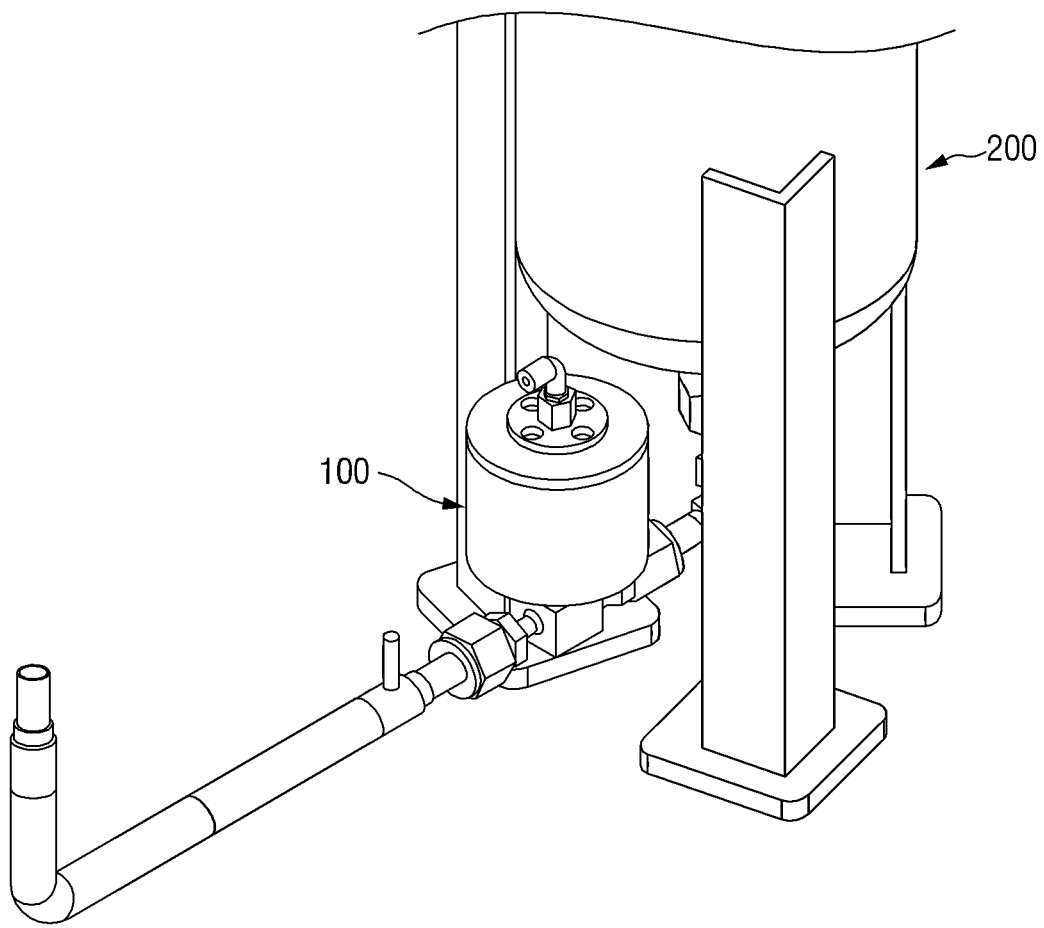
FIG. 1 is an exemplary perspective view illustrating a semiconductor processing device according to some embodiments.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. Like numbers refer to like elements throughout the description of the figures.

When it is stated that an element or a layer is "on" another element or layer, not only being directly on another element or layer but also interposing another layer or element therebetween are included. On the other hand, when it is stated that an element is "directly on" another, there is no other element or layer interposed therebetween.

The spatially relative terms "below," "beneath," "lower," "above," "upper" may be used to easily describe the correlation of a device or components with other devices or components. Spatially relative terms are to be understood as including terms in different directions of the device in use or operation in addition to the directions shown in the figures. For example, when flipping a device shown in the figure, a device described as "below" or "beneath" of another device may be placed "above" of another device. Thus, the exemplary term "below" can encompass both an orientation of above and below. The device can also be oriented in other directions, so that spatially relative terms can be interpreted according to orientation.

Although the first, second, etc. are used to describe various elements, components and/or sections, these elements, components and/or sections are of course not limited by these terms. These terms are only used to distinguish one element, component or section from another element, component or section. Therefore, the first device, the first component, or the first section mentioned below may be a second device, a second component, or a second section within the technical spirit of the present disclosure.

The terminology used herein is for the purpose of describing particular embodiments only and is not intended to be limiting of the invention. In this specification, the singular also includes the plural unless specifically stated otherwise in the phrase. As used herein, "comprises" and/or "comprising" refers to the presence of one or more other components, steps, operations and/or elements. Or does not exclude additions.

Unless otherwise defined, all terms (including technical and scientific terms) used in the present specification may be used in a sense that can be commonly understood by those skilled in the art. In addition, the terms defined in the commonly used dictionaries are not ideally or excessively interpreted unless they are specifically defined clearly.

Hereinafter, preferred embodiments according to the present disclosure are described in detail with reference to the accompanying drawings. The same or similar elements are assigned the same reference numerals irrespective of their reference numerals, and a redundant description thereof is omitted.

FIG. 1 is an exemplary perspective view illustrating a semiconductor processing device according to some embodiments.

Referring to FIG. 1, a semiconductor processing device 10 according to some embodiments includes a valve apparatus 100 and a supercritical liquefier 200.

The semiconductor processing device 10 may be, for example, a portion of an atomic layer deposition (ALD) device, a chemical vapor deposition (CVD) device, or an atomic layer chemical vapor deposition (ALCVD) device. The present disclosure is not limited thereto, and the semiconductor processing device 10 may illustrate, for example, a portion of a semiconductor processing device that performs production of other semiconductors configured to execute a thin film deposition process, an oxidation or nitriding process, an etching process, a polishing process, or a lithography process performed to produce semiconductor elements on a substrate such as silicon wafers or glass plates.

The valve apparatus 100 may be installed in a lower part of the supercritical liquefier 200. The valve apparatus 100 may control the flow of fluid supplied to the supercritical liquefier 200 or received from the supercritical liquefier 200. A detailed configuration and operation of the valve apparatus 100 will be described in detail with reference to FIG. 2.

The supercritical liquefier 200 may make liquid to be used in a process of processing a semiconductor. For example, the supercritical liquefier 200 may liquefy the gas supplied through the valve apparatus 100 into liquid.

In the process of liquefying gas into liquid, the supercritical liquefier 200 may reduce the temperature of atmosphere and/or moisture around the supercritical liquefier 200, resulting in freezing of the atmosphere and/or moisture.

For example, the valve apparatus 100 disposed in the lower part of the supercritical liquefier 200 may be affected by the freezing caused by the supercritical liquefier 200, which may cause defects in the valve apparatus 100.

Therefore, as described below, an airtight member can be mounted on the valve apparatus 100, thus in advance preventing defects caused by the supercritical liquefier 200. Hereinafter, the valve apparatus 100 and a method of manufacturing a semiconductor processing device including the valve apparatus 100 according to some embodiments will be described in detail.

Figure 2:
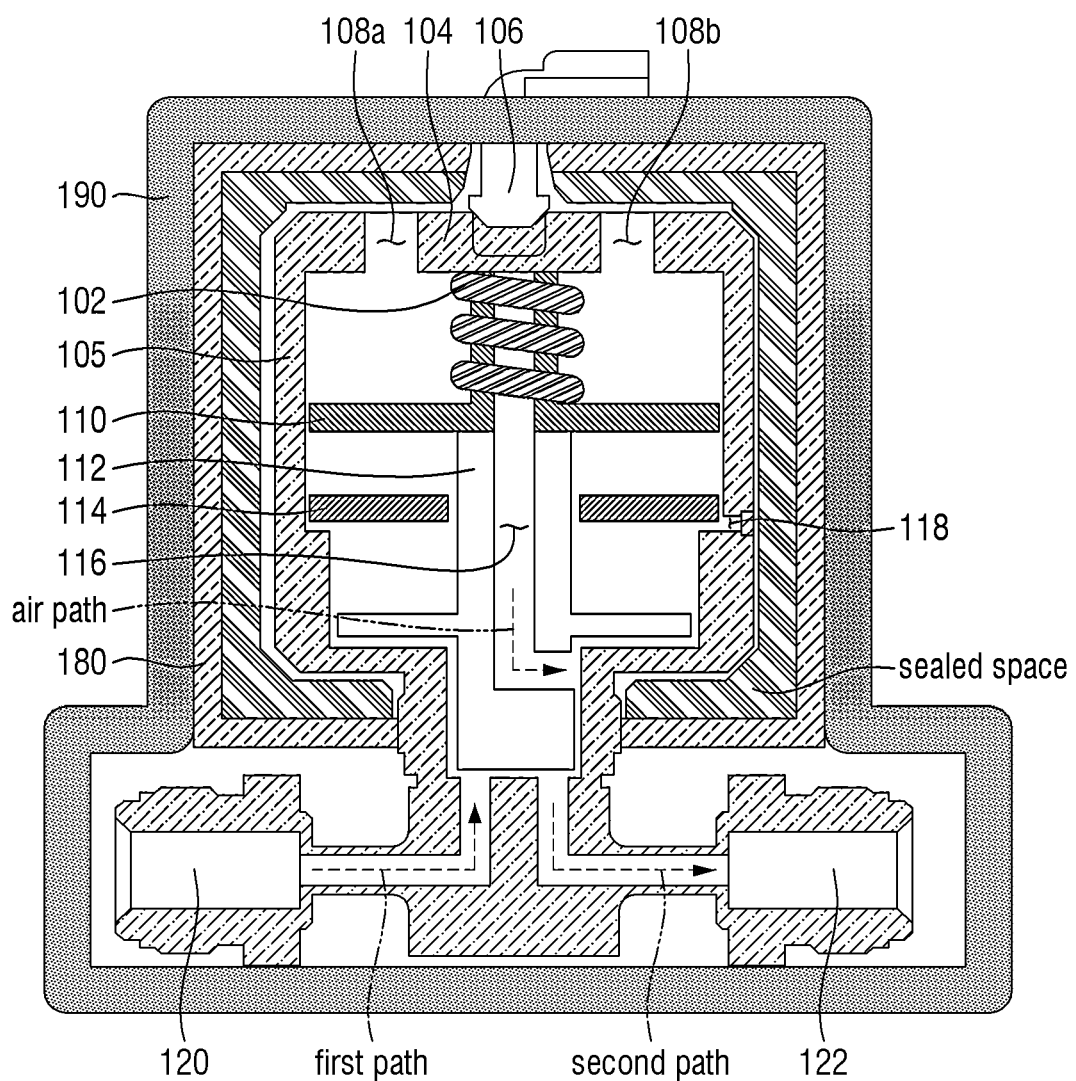
FIG. 2 is an exemplary sectional view illustrating a valve apparatus according to some embodiments.

FIG. 2 is an exemplary sectional view illustrating a valve apparatus according to some embodiments.

Referring to FIG. 2, the valve apparatus 100 according to some embodiments may include a heat insulating material 190, an airtight member 180, a spring 102, a force introduction cap 104, a valve housing 105, an adjusting member 106, safety valve outlets 108a and 108b, a safety valve body 110, a valve piston 112, a piston ring 114, a pneumatic passage 116, a valve inlet 118, a first gas supplier 120, and a second gas supplier 122.

The configuration of the valve apparatus 100 is not limited thereto, and may further include other components.

The valve apparatus 100 may have a frame formed by the valve housing 105 including the valve inlet 118. In addition, the valve housing 105 may include the safety valve outlets 108a and 108b. The valve piston 112 may be inserted into the valve housing 105, and the valve piston 112 may include the piston ring 114.

In the perimeter of the valve inlet 118, the valve housing 105 may further include a protrusion in which the piston ring 114 is stopped.

The valve piston 112 includes the pneumatic passage 116, and the pneumatic passage 116 may be formed by a through bore penetrating the valve piston 112. The through bore may be coaxial with an axis of the valve piston 112.

Pressure is applied to the valve piston 112 through the adjusting member 106 and through the spring 102 as contracted or relaxed. The spring 102 may apply a spring load to the valve piston 112 by an elastic force of the spring 102, and the spring 102 can be configured to ensure that the safety valve body 110 is not in contact with the piston ring 114, by the elastic force of the spring 102.

The spring 102 may be disposed in a lower part of the force introduction cap 104. The adjusting member 106 is disposed on the force introduction cap 104, and according to the movement of the adjusting member 106, force can be transmitted to the spring 102 to contract or relax the spring 102.

The air injected into the valve apparatus 100 may be moved along the pneumatic passage 116 via an air path.

The valve apparatus 100 may control the flow of gas, purge gas, or process gas supplied from the first gas supplier 120 and transmitted to the second gas supplier 122. In what follows, it is collectively referred to as gas.

More specifically, the gas supplied from the first gas supplier 120 may be controlled to be supplied to the second gas supplier 122 through the valve piston 112 along a first path. When the valve piston 112 is opened so that the gas can be supplied to the second gas supplier 122, the gas may be transmitted to the second gas supplier 122 along a second path. However, when the valve piston 112 is closed, the gas supplied from the first gas supplier 120 may not be transmitted to the second gas supplier 122.

The supply path of the gas is not limited to the present drawings, and the gas supplied from the second gas supplier 122 may be controlled to be supplied to the first gas supplier 120 through the valve piston 112 along the second path. When the valve piston 112 is opened so that the gas can be supplied to the first gas supplier 120, the gas may be transmitted to the first gas supplier 120 along the first path. However, when the valve piston 112 is closed, the gas supplied from the second gas supplier 122 may not be transmitted to the first gas supplier 120.

At this time, the valve apparatus 100 according to some embodiments includes the airtight member 180 that surrounds the valve housing 105 to block the penetration of external substances (e.g., water vapor frozen by the supercritical liquefier 200).

The airtight member 180 may be made up of, for example, a material containing resin. More specifically, the airtight member 180 may be made up of plastic.

The valve apparatus 100 according to some embodiments may include the airtight member 180 to form a sealed space between the airtight member 180 and the valve housing 105, thus preventing the penetration of the external materials (e.g., water vapor frozen by the supercritical liquefier 200) into the valve housing 105, which can prevent the defects of the valve apparatus 100.

The valve apparatus 100 according to some embodiments includes the heat insulating material 190 surrounding the airtight member 180. The heat insulating material 190 may surround the first gas supplier 120 and the second gas supplier 122.

The heat insulating material 190 may be made up of, for example, Styrofoam. For another example, the heat insulating material 190 may be made up of sponge.

The valve apparatus 100 according to some embodiments includes the airtight member 180, thus preventing damage to the insulation material 190 due to the air pressure generated when the gas is introduced and/or discharged through the valve inlet 118 and/or the safety valve outlets 108a and 108b.

Figure 3:
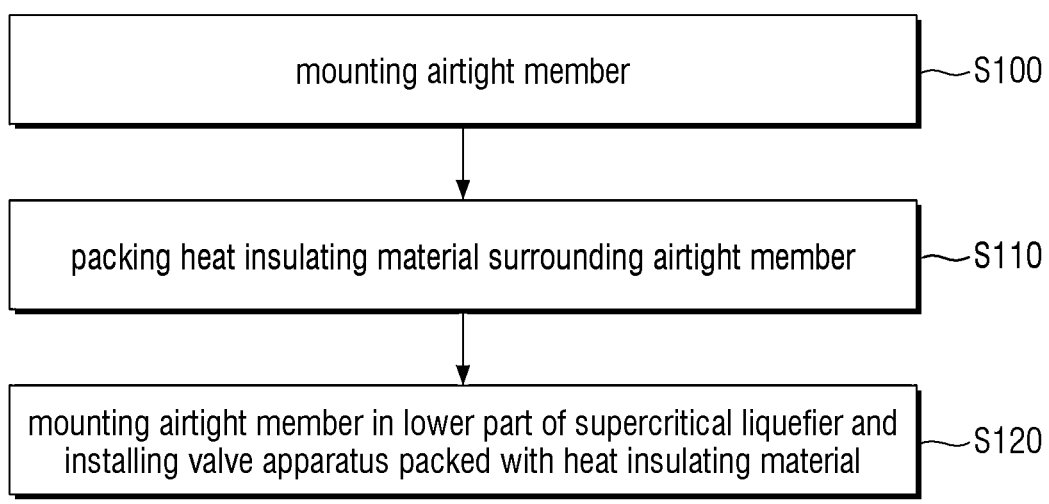
FIG. 3 is an exemplary flowchart illustrating a method for manufacturing the semiconductor processing device according to some embodiments.

FIG. 3 is an exemplary flowchart illustrating a method for manufacturing the semiconductor processing device according to some embodiments.

Referring to FIGS. 1 to 3, the adjusting member 106, the spring 102 that contracts or relaxes through the adjusting member 106, the safety valve body 110 that contracts or relaxes with the spring 102, the valve piston 112 to which pressure is applied according to the movement of the safety valve body 110, the piston ring 114 that surrounds the valve piston 112, the valve housing 105 that surrounds the adjusting member 106, the spring 102, the safety valve body 110, the valve piston 112 and the piston ring 114, and the airtight member 180 that forms a sealed space that blocks the penetration of the external substances (e.g., water vapor frozen by the supercritical liquefier 200) by surrounding the valve housing 105, are mounted (S100).

Then, the heat insulating material 190 surrounding the airtight member 180 is packed (S110).

Then, the valve apparatus 100 according to some embodiments, including the airtight member 180 and the heat insulating material 190, is installed in the lower part of the supercritical liquefier 200 (S120).

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. A valve apparatus, comprising:
   a spring;
   an adjusting member that transmits force to the spring to cause the spring to contract or relax;
   a safety valve body configured to contract or relax with the spring;

a valve piston pressurized by a movement of the safety valve body to also contract or relax with the spring;
a piston ring configured to surround the valve piston;
a valve housing configured to surround the adjusting member, the spring, the safety valve body, the valve piston, and the piston ring;
an airtight member configured to form a sealed space that blocks penetration of external materials by surrounding the valve housing;
a heat insulating material configured to surround the airtight member;
a first gas supplier that supplies gas into the valve apparatus; and
second gas supplier that receives the gas from the first gas supplier,
wherein the valve housing is spaced apart from the airtight member and separated by the sealed space, and
wherein a portion of the valve housing making up the first gas supplier and the second gas supplier is not surrounded by the airtight member such that sealed space is not formed around the first gas supplier and the second gas supplier.

2. The valve apparatus of claim 1, wherein the airtight member is made up of resin.

3. The valve apparatus of claim 2, wherein the airtight member is made up of plastic.

4. The valve apparatus of claim 1, wherein the heat insulating material is made up of a polystyrene material.

5. The valve apparatus of claim 1, further comprising:
a first path within the valve housing in connection with the first gas supplier;
a second path within the valve housing in connection with the second gas supplier and the first path,
wherein the first path is connected to the second path based on a position of the valve piston where the first path is connected to the second path when the valve piston is in an open state and the first path is blocked from the second path when the valve piston is in a closed state; and
wherein a portion of the valve housing making up the first path and the second path is not surrounded by the airtight member such that sealed space is also not formed around the first path and the second path.

6. A valve apparatus, comprising:
a spring;
an adjusting member that transmits force to the spring to cause the spring to contract or relax;
a safety valve body configured to contract or relax with the spring;
a valve piston pressurized by a movement of the safety valve body to also contract or relax with the spring;
a piston ring configured to surround the valve piston;
a valve housing configured to surround the adjusting member, the spring, the safety valve body, the valve piston, and the piston ring;
an airtight member configured to form a sealed space that blocks penetration of external materials by surrounding the valve housing; and
a heat insulating material configured to surround the airtight member,
wherein the heat insulating material is different and separate from the airtight member and an internal layer of the heat insulating material is directly attached to an external layer of the airtight member as the heat insulating material surrounds the airtight member.

7. A valve apparatus, comprising:
a spring;
an adjusting member that transmits force to the spring to cause the spring to contract or relax;
a safety valve body configured to contract or relax with the spring;
a valve piston pressurized by a movement of the safety valve body to also contract or relax with the spring;
a piston ring configured to surround the valve piston;
a valve housing configured to surround the adjusting member, the spring, the safety valve body, the valve piston, and the piston ring;
an airtight member configured to form a sealed space that blocks penetration of external materials by surrounding the valve housing; and
a heat insulating material configured to surround the airtight member,
wherein the valve housing, the airtight member, and the heat insulating material are different and separate components, and the valve piston comprises a pneumatic passage that penetrates through a body of the valve piston.

* * * * *